Patented Aug. 8, 1950

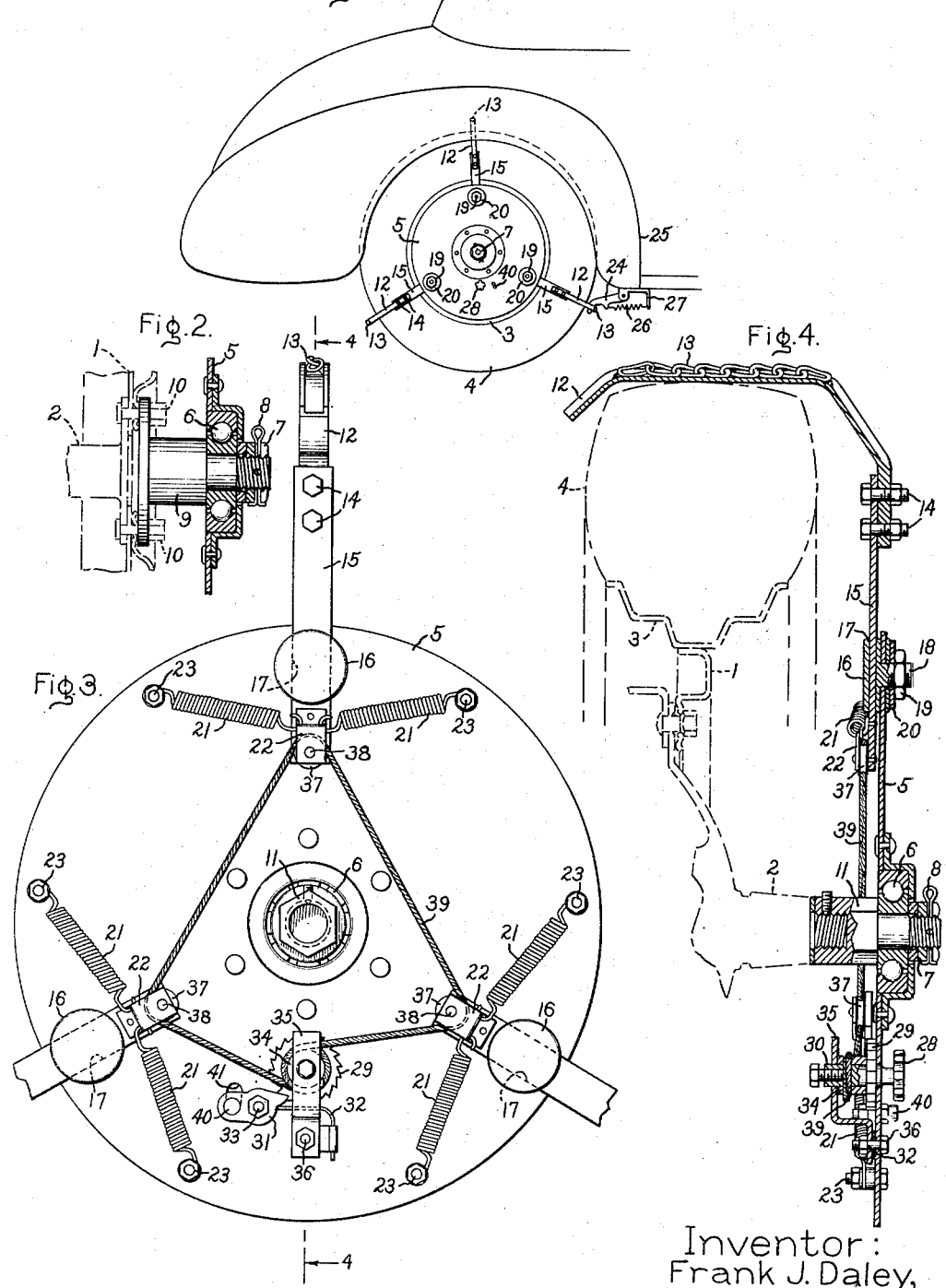

2,517,634

UNITED STATES PATENT OFFICE 2,517,634

ANTISKID DEVICE

Frank J. Daley, Schenectady, N. Y.

Application August 8, 1947, Serial No. 767,572

13 Claims. (Cl. 152—216)

1

My invention relates to antiskid devices which are particularly useful in connection with self-propelled road vehicles.

An object of my invention is to provide an improved antiskid or traction-increasing arrangement for vehicles.

Another object of my invention is to provide an improved antiskid or traction-increasing arrangement for vehicles wherein the antiskid mechanism is continuously carried by the vehicle and can be made effective or ineffective with relatively little effort.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a fragmentary side elevational view of a vehicle showing a rear vehicle wheel equipped with an embodiment of my improved antiskid device; Fig. 2 is a partial sectional view of the end of an axle for a vehicle wheel such as that shown in Fig. 1 illustrating one arrangement for securing my improved antiskid device to a vehicle wheel; Fig. 3 is a side elevational view, partly broken away, illustrating the antiskid device shown in Fig. 1 as viewed from the inner or wheel side of the device; and Fig. 4 is a partial sectional view taken along line 4—4 of Fig. 3.

Referring to the drawing, I have shown a fragmentary view of a self-propelled vehicle, such as an automobile, provided with an embodiment of my improved antiskid device in which the vehicle is adapted to be driven by traction wheels, each of which includes a central metal disc member 1 mounted on a drive axle 2 and provided with a rim 3 on which a suitable tire 4 is mounted. In general, antiskid devices adapted for use with automobile wheels require that the device remain in operative position whenever it is attached to a vehicle wheel. With my improved arrangement, the antiskid device is adapted to be secured permanently around the vehicle wheel and to be placed in operative position whenever desired by a simple manual operation. Similarly, the device may be removed from its operative position by a relatively simple manual operation.

In order to obtain this desired simple operation for placing the antiskid device in operative and inoperative positions, it is provided with a main supporting disk member 5 which is removably

2 and rotatably mounted relative to the wheel substantially coaxially therewith by any suitable mounting construction which can be varied according to the type wheel and axle to which it is to be applied. Figs. 2 and 4 illustrate two different types of automobile wheels and axles and arrangements for mounting the main antiskid derangements for mounting the main antiskid device supporting disk member thereon. In the construction shown in Fig. 2, the main supporting disk member is rotatably mounted on a suitable bearing shown as an antifriction ball bearing 6 which is secured in position by a suitable nut 7 and cotter pin 8 on a stub shaft 9 which is removably secured by a plurality of bolts 10 which extend through the bolt holes which secure the disk 1 of the wheel to the axle 2. In the construction shown in Fig. 4, the main supporting disk member 5 is rotatably supported by a suitable bearing illustrated as a ball bearing 6 secured in position in any suitable manner by a nut 7 and a cotter pin 8 on a stub shaft 11 which is secured to the end of the axle 2.

In order to provide the desired antiskid or traction-increasing effect, my antiskid device is provided with a plurality of traction members, preferably 3 in number, each of which includes an element 12 adapted to extend transversely over the outer periphery of the wheel and tire and is preferably provided with a chain or similar section 13 secured to the outer surface thereof. This chain section may be of any suitable form and is preferably secured by welding to the transversely extending member 12. In order to provide a suitable support and to facilitate removal of the transversely extending elements 12 when they become worn, each of these elements is removably secured by a plurality of bolts 14 to the outer end of a supporting arm 15 retractably mounted in a guide member 16 which is formed with a guide slot 17 therein through which the supporting arm 15 may readily slide. The supporting guide 16 is rotatably mounted on the main supporting disk 5 by being provided with a stub shaft portion 18 which extends through an aperture in the disk 5 and is held in position by a nut 19 which threadedly engages the end of the stub shaft 18 and is drawn up tightly against a washer 20. The guide member 16 is adapted to guide the supporting arm 15 in slidable relationship such that it can be moved towards and away from the axis of the main supporting member on the inner or wheel side of the main supporting disc 5 between the disc and the wheel and is normally biased out of engagement with the outer peripheral surface of the tire 4 and away from the axis of the supporting disk and the wheel by a pair of tension coil springs 21 arranged one on each side of the supporting arm 15 and secured thereto adjacent the inner end thereof to a clamp 22. The other ends of the springs 21 are secured to the main supporting disk 5 adjacent the outer periphery thereof in any suitable manner, shown as bolts 23, and these springs function to center the inner end of the supporting arm 15 in addition to biasing it outwardly away from the supporting axle 2.

When the traction members are biased outwardly out of engagement with the outer periphery of the tire 4, the antiskid device is adapted to be held stationary in inoperative relation on the wheel by a simple latch including a latching finger 24 which latchingly engages one of the transversely extending members 12 and which is secured to the vehicle frame in any suitable manner, as by being bolted to the underside of a vehicle fender 25, and is biased into latched position by a tension spring 26 which is secured to the finger 24 and to a mounting bracket 27. When it is desired to place the antiskid device in operative position, the latching finger 24 is merely raised out of latched position against the tension of the spring 26, and the latching finger 24 then is biased by the spring 25 towards the bracket 27 out of engagement with the transversely extending member 12.

The traction members may be placed in traction-increasing position relative to the vehicle wheel by simple manual operation of an operating member, such as a knob 28 secured to a pawl and ratchet device including a ratchet wheel 29 secured to the inner end of a shaft 30 which forms a part of the operating knob 28 and a pawl 31 which is biased in any suitable manner, as by a spring 32, into engagement with the ratchet wheel 29. The pawl 31 is rotatably mounted on the main supporting disk 5 in any suitable manner, as by a bolt 33, and a pulley 34 also is mounted on the shaft 30 and is held in position by a bracket 35 which is secured by a bolt 36 to the main supporting disk 5. The supporting arms 15 are adapted to be drawn inwardly or retracted by a cable arrangement which is operatively connected to the pawl and ratchet device and includes a guide pulley 37 mounted on the inner end of each arm 15 on the bracket 22 by a suitable spindle 38. A suitable cable 39 extends around each of the pulleys 37, and the ends thereof are secured to the ratchet pulley 34, such that as the ratchet 29 is turned by the operating knob 28, the cable 39 is wound about the pulley 33 and draws the pulleys 37 and the arms 15 inwardly towards the axis of the main supporting member 5 until the transversely extending traction elements 12 engage the outer periphery of the tire 4, in which position the traction members are in operative position and are adapted to be driven with the wheel on rotation of the wheel. Thus the anti-skid device may be placed in the desired operative position by merely releasing the latching finger 24 and turning the knob 28 whenever it is desired to apply the anti-skid device for increasing the traction of the wheel.

In order to place the antiskid device in inoperative position, it is merely necessary to press a button 40 which extends through a slot 41 in the main supporting disk member 5 such that the pawl 31 is biased against the action of the spring 32 and is disengaged from the ratchet 29. This pin 40 is secured to the end of the pawl 31 in such a manner that when it is depressed or moved towards the axis of the wheel, it will rotate the pawl so as to release the ratchet and the spring 21 will bias the supporting arms 15 outwardly away from the axis of the main supporting member 5 so as to move the transversely extending elements 12 out of engagement with the outer periphery of the tire 4. This relatively simple manual release of the cable winding arrangement provides for movement of the supporting arms 15 and the transversely extending traction members from operative to inoperative positions, after which one of the transversely extending members 12 is adapted to be latched by the latching finger 24 to prevent further rotation of the antiskid device with the wheel and to hold it in a relatively stationary position with respect to the wheel on the bearings 6.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An antiskid device for a vehicle wheel including a disk member, a plurality of traction members each adapted to extend transversely over the outer periphery of the wheel, mounting means for mounting said traction members on said disk member, a pawl and ratchet device on said disk member, flexible means operatively connected to said pawl and ratchet device and to said traction members for manually retracting said transversely extending traction members inwardly into engagement with the outer periphery of the wheel, and means for releasing said pawl from engagement with said ratchet device to provide for release of said flexible retracting means and for movement of said traction members out of engagement with the wheel.

2. An antiskid device for a vheicle wheel including a main supporting member, means for rotatably mounting said main supporting member relative to the wheel, a plurality of traction members each adapted to extend transversely over the outer periphery of the wheel, mounting means for mounting each of said traction members on said main supporting member, resilient means operatively arranged between said main supporting member and said traction members for biasing said traction members outwardly, latchable manually operable retracting means on said supporting member and connected to said transversely extending traction members for retracting said traction members inwardly into latched positions in engagement with the outer periphery of the wheel for driving said antiskid device by the wheel on rotation thereof, and manually operable means on said supporting member for releasing said transversely extending traction members from inwardly latched position for movement thereof outwardly out of engagement with the wheel under action of said biasing means.

3. An antiskid device for a vehicle wheel mounted on an axle including a main supporting member, means for rotatably mounting said main supporting member on the axle on the outer side of the wheel, a plurality of traction members each adapted to extend transversely over the outer periphery of the wheel, mounting means for mounting each of said traction members on said main supporting member, resilient means operatively arranged between said main supporting member and said traction members for biasing said traction members outwardly from the axle, latchable manually operable means on said supporting member connected to said transversely extending traction members for retracting said traction members inwardly into latched positions in engagement with the outer periphery of the wheel for driving said antiskid device by the wheel on rotation thereof, and manually operable means extending through said main supporting member to the outer side thereof for releasing said transversely extending traction members from inwardly latched position for movement thereof outwardly out of engagement with the wheel under action of said biasing means.

4. An antiskid device for a vehicle wheel including a main supporting member, means for removably and rotatably mounting said main supporting member relative to the wheel substantially coaxially therewith, a plurality of traction members each adapted to extend transversely over the outer periphery of the wheel, mounting means for mounting each of said traction members on said main supporting member, resilient means operatively arranged between said main supporting member and said traction members for biasing said traction members outwardly from the axis of said main supporting member, latchable manually operable means on said supporting member connected to said transversely extending traction members for retracting said traction members inwardly into latched engagement with the outer periphery of the wheel for driving said antiskid device by the wheel on rotation thereof, and manually operable means for unlatching said retracting means to provide for movement of said transversely extending traction members outwardly out of engagement with the wheel under the action of said biasing means.

5. An antiskid device for a vehicle wheel having a tire thereon including a main supporting member, means for rotatably mounting said main supporting member relatively to the wheel substantially coaxially therewith, a plurality of traction members each adapted to extend transversely over the outer periphery of the wheel tire, mounting and guide means for mounting each of said traction members on said main supporting member and for guiding said traction members towards and away from the axis of said main supporting member, resilient means operatively arranged between said main supporting member and said traction members for biasing said traction members outwardly from the axis of said main supporting member, latchable retracting means on said supporting member connected to said traction members for inwardly retracting and latching said transversely extending traction members in engagement with the outer periphery of the tire on the wheel, and manually operable means on said supporting member for unlatching said traction members to provide for movement of said transversely extending traction members outwardly out of engagement with the wheel tire.

6. An antiskid device for a vehicle wheel including a main supporting member, means for rotatably mounting said main supporting member relative to the wheel substantially coaxially therewith, a plurality of traction members each adapted to extend transversely over the outer periphery of the wheel, mounting means for mounting each of said traction members on said main supporting member, resilient means operably connected to said main supporting member and to said traction members for resiliently biasing said traction members outwardly from the axis of said main supporting member, latchable manually operable means on said supporting member connected to said traction members for retracting said transversely extending traction members inwardly into latched engagement with the outer periphery of the wheel, manually operable means for unlatching said transversely extending traction members for movement thereof outwardly out of engagement with the wheel, and means including a manually operable latch mounted on the vehicle arranged to engage one of said transversely extending traction members for latching said antiskid device against rotation when said transversely extending traction members are biased outwardly out of engagement with the wheel.

7. An antiskid device for a vehicle wheel having a tire thereon including a main supporting member, means for rotatably mounting said main supporting member relative to the wheel substantially coaxially therewith, a plurality of traction members each adapted to extend transversely over the outer periphery of the wheel tire, mounting and guide means on said main supporting member for mounting each of said traction members on said main supporting member and for guiding said traction members towards and away from the axis of said main supporting member, resilient means operatively arranged between said main supporting member and said traction members for biasing said traction members outwardly from the axis of said main supporting member, latchable retracting means on said supporting member connected to said traction members for inwardly retracting and latching said transversely extending traction members in engagement with the outer periphery of the tire on the wheel, manually operable means for unlatching said retracting means to provide for movement of said transversely extending traction members outwardly out of engagement with the wheel tire, and manually releasable latching means for latching said antiskid device against rotation when said transversely extending traction members are biased outwardly out of engagement with the wheel tire.

8. An antiskid device for a vehicle wheel including a main supporting member, means for rotatably mounting said main supporting member relative to the wheel on the outer side thereof and adjacent thereto substantially coaxially therewith, a plurality of traction members each including a chain section mounted on an element adapted to extend transversely over the outer periphery of the wheel, mounting and guide means for mounting each of said traction members on said main supporting member and providing for guiding said traction members towards and away from the axis of said main supporting member, resilient means secured to said main supporting member and to said traction members for biasing said traction members outwardly from the axis of said main supporting member, a cable means operably connected to said traction members, latchable winding means on said supporting member for winding said cable means for retracting said transversely extending traction members inwardly into engagement with the outer periphery of the wheel, and manually operable means for unlatching said cable winding means to provide for movement of said traction members outwardly out of engagement with the wheel.

9. An antiskid device for a vehicle wheel having a tire thereon including a main supporting member, means for rotatably mounting said main supporting member relative to the wheel substantially coaxially therewith, a plurality of traction members each adapted to extend transversely over the outer periphery of the wheel tire, mounting and guide means for mounting each of said traction members rotatably on said main supporting member and for slidably guiding said traction members towards and away from the axis of said main supporting member, resilient means operatively arranged between said main supporting member and said traction members for biasing said traction members outwardly from the axis of said main supporting member, means including a cable means and a pawl and ratchet device having a pulley secured to said ratchet and to the ends of said cable means and rotatably mounted on said main supporting member with an operating element on the outer side of said main supporting member for turning said ratchet and winding said cable means on said ratchet pulley for retracting said traction members inwardly into engagement with the outer periphery of the tire on the wheel, and manually operable means for releasing said pawl from engagement with said ratchet thereby releasing said ratchet pulley to provide for movement of said traction members outwardly out of engagement with the wheel tire under action of said biasing means.

10. An antiskid device for a vehicle wheel having a tire thereon including a main supporting member, means for rotatably mounting said main supporting member relative to the wheel substantially coaxially therewith, a plurality of traction members each adapted to extend transversely over the outer periphery of the wheel tire, mounting and guide means for mounting said traction members rotatably on said main supporting member and for slidably guiding said traction members towards and away from the axis of said main supporting member, resilient means operatively arranged between said main supporting member and said traction members for biasing said traction members outwardly from the axis of said main supporting member, means including a cable means and a manually releasable pawl and ratchet device having a pulley secured to said ratchet and to the ends of said cable means and rotatably mounted on said main supporting member with an operating element on the outer side of said main supporting member for turning said ratchet and winding said cable means on said ratchet pulley for retracting said traction members inwardly into engagement with the outer periphery of the tire, and manually operable latching means for latching said antiskid device against rotation when said transversely extending traction members are biased outwardly from engagement with the wheel tire.

11. An antiskid device for a vehicle wheel having a tire thereon including a supporting disk member, means including a bearing for rotatably mounting said supporting member relative to the wheel on the outer side thereof and adjacent thereto substantially coaxially therewith, a plurality of traction members each adapted to extend transversely over the outer periphery of the wheel tire, means for supporting each of said transversely extending elements, rotatable mounting means including a guide member for mounting each of said traction member supporting means rotatably on said supporting disk member and having a guide slot section therein providing for slidably guiding said supporting means towards and away from the axis of said supporting disk member, means including a pair of tension coil springs arranged one on each side of each of said supporting means and secured thereto adjacent the inner end thereof and to said supporting disk member adjacent the outer edge thereof for resiliently biasing said supporting means outwardly from the axis of said supporting disk member, and manually operable means for retracting said supporting means and said transversely extending traction members inwardly into engagement with the outer periphery of the tire on the wheel.

12. An antiskid device for a vehicle wheel having a tire thereon including a supporting disk member, means for rotatably mounting said supporting disk member relative to the wheel substantially coaxially therewith, a plurality of traction members each including a chain section mounted on an element adapted to extend transversely over the outer periphery of the wheel tire, means including an arm for supporting each of said transversely extending elements, demountable securing means for securing each of said transversely extending elements to one of said supporting arms, rotatable mounting and slide guiding means on the inner side of said supporting disk member for mounting each of said supporting arms rotatably on said supporting disk member and for slidably guiding said supporting arms towards and away from the axis of said supporting disk member on the inner side of said supporting disk between said disk and the wheel, resilient means operatively arranged between said supporting disk member and said supporting arms for biasing said supporting arms outwardly from the axis of said supporting disk member, a cable means and a manually operable pawl and ratchet device having a pulley secured to said ratchet and to the ends of said cable means and rotatably mounted on said supporting disk member with an operating element on the outer side of said supporting disk member for turning said ratchet and winding said cable means on said ratchet pulley and retracting said supporting arms and said transversely extending elements inwardly into engagement with the outer periphery of the tire on the wheel, and manually operable means for latching said antiskid device against rotation when said transversely extending elements are biased outwardly from engagement with the wheel tire.

13. An antiskid device for a vehicle wheel having a tire thereon including a supporting disk member, bearing means for rotatably mounting said supporting disk member relative to the wheel on the outer side thereof and adjacent thereto substantially coaxially therewith, a plurality of traction members each including a chain section mounted on an element adapted to extend transversely over the outer periphery of the wheel tire, a rotatable mounting and slide guiding member for mounting each of said traction members rotatably on said supporting disk member and for slidably guiding said traction members towards and away from the axis of said supporting disk member, means including a pair of tension coil springs arranged one on each side of each of said traction members and secured thereto adjacent the inner end thereof and to said supporting disk member adjacent the outer edge thereof for resiliently biasing said traction members outwardly from the axis of said supporting disk member, a guide pulley rotatably mounted on each of said traction members adjacent the inner end with a cable means arranged in engagement with the outer periphery of each of said guide pulleys, means including a pawl and ratchet device having a pulley secured to said ratchet and to the ends of said cable means and rotatably mounted on said supporting disk member with an operating element on the outer side of said supporting disk member for turning said ratchet and winding said cable means on said ratchet pulley and retracting said traction members inwardly into engagement with the outer periphery of the tire, resilient means for biasing said pawl into latching engagement with said ratchet, and means including a pin on said pawl extending through a slot in said supporting disk member for releasing said pawl from engagement with said ratchet.

FRANK J. DALEY.

REFERENCES CITED

The following references are of record in the file of this patent:

UNITED STATES PATENTS

| Number | Name | Date |
|---|---|---|
| 2,195,983 | Daley | Apr. 2, 1940 |
| 2,255,178 | Machain | Sept. 9, 1941 |
| 2,423,759 | Edwards | July 8, 1947 |